United States Patent [19]

Kawabe

[11] Patent Number: 5,788,173
[45] Date of Patent: Aug. 4, 1998

[54] FRAME STRUCTURE FOR SPINNING REEL

[75] Inventor: Yuzo Kawabe, Izumi, Japan

[73] Assignee: Shimano, Inc., Osaka, Japan

[21] Appl. No.: 818,926

[22] Filed: Mar. 17, 1997

[30] Foreign Application Priority Data

Apr. 25, 1996 [JP] Japan .................. 8-103032
Feb. 13, 1997 [JP] Japan .................. 9-029286

[51] Int. Cl.$^6$ .................. A01K 89/01
[52] U.S. Cl. .................. 242/311; 242/316
[58] Field of Search .................. 242/316, 311

[56] References Cited

U.S. PATENT DOCUMENTS 3,788,570  1/1974  Yamazaki et al. .......... 242/311
5,350,130  9/1994  Hitomi et al. ............. 242/283
5,443,571  8/1995  Kang ...................... 242/311
5,540,397  7/1996  Yoshikawa ................ 242/283

*Primary Examiner*—Katherine Matecki
*Attorney, Agent, or Firm*—Jeffer, Mangels, Butler & Marmaro LLP

[57] ABSTRACT

A spinning reel frame structure for a spinning reel having a spool, a rotor and a handle coupled to the rotor for rotating the rotor includes a frame assembly and a cover. The frame assembly rotatably supports the handle and rotor, and supports the spool, and has a side in which an opening is defined. The cover includes a cover member that is detachably affixed to the frame assembly and that covers the opening in the frame assembly, and a mounting leg member which projects from the cover member and which has a distal end provided with a rod mounting member.

16 Claims, 8 Drawing Sheets

FRAME STRUCTURE FOR SPINNING REEL

FIELD OF THE INVENTION

The present invention relates to a frame structure, and particularly to a frame structure for a spinning reel whereby the fishing line is reeled onto a spool by means of a rotor, mounted on the fishing rod, whose rotation is coupled with the rotation of a handle.

BACKGROUND OF THE INVENTION

The conventional spinning reel is equipped with a reel body, a rotor that is rotatably supported on the reel body, and a spool which is disposed forward of the rotor, around whose outside surface the fishing line is wound. The reel body is equipped with a handle for rotating the rotor.

The reel body is usually fabricated from an injection-molded resin or aluminum die casting, and is provided with an integrally formed frame assembly and mounting leg, and with a cover. The drive components are disposed within the frame assembly. The mounting leg has a leg member that projects upward from the frame assembly, and a rod mounting member that projects to the sides at the distal end of the leg member. The cover member is used to cover the opening of the frame assembly. The rotor is rotatably supported on the frame assembly, and is rotatably driven by a drive mechanism provided thereto. The spool is supported on the frame assembly in such a manner that it can move forward and backward, and is moved forward and backward by a level wind mechanism provided thereto. The rotating handle shaft is rotatably supported by the frame assembly and the cover.

Lighter weight and higher precision are desirable in this type of spinning reel. The frame assembly can be made lighter in weight and more precise by thinning the wall and reducing sinkage during molding. However, it is necessary to make the mounting leg fairly thick in order to maintain adequate strength. In the conventional structure described above, the frame assembly and the mounting leg are integrally formed. Thus, reducing the frame assembly wall thickness in order to reduce weight and improve precision can produce thickness deviations in the thin-walled frame assembly due to pull exerted on the frame assembly by the thick mounting leg during molding. In frame assemblies of which high precision is required, this can produce molding strain and uneven shrinkage, making it difficult to maintain a high degree of precision.

Attempting to avoid this problem by reducing the thickness of the mounting leg reduces the strength of the mounting leg, creating the risk that the mounting leg will break off. Where the mounting leg and frame assembly are fabricated separately, high strength is required at the joint between the mounting leg and the frame assembly, and this entails a rather complex joint structure.

A need exists for a spinning reel frame in which frame assembly precision can be maintained while at the same time maintaining high strength in the mounting leg through a simple structure.

SUMMARY OF THE PREFERRED EMBODIMENTS

In accordance with one aspect of the present invention, there is provided a spinning reel frame structure for a spinning reel that includes a spool, a rotor and a handle coupled to the rotor for rotating the rotor. The spinning reel frame structure is mountable on a fising rod, and includes a frame assembly and cover. The frame assembly rotatably supports the handle and the rotor, and also supports the spool. The frame assembly has a side in which an opening is defined. The cover includes a cover member that is detachably affixed to the frame assembly and that covers the opening in the frame assembly, and a mounting leg member which projects from the cover member. The mounting leg member has a distal end provided with a rod mounting member whereby the spinning reel may be mounted on a fishing rod.

In the inventive frame structure, the frame assembly and the mounting leg member are constituted as separate members. Since the presence of both thin areas and thick areas in a single component is eliminated, thick areas remain unaffected during molding, even when the wall thickness of the frame assembly is reduced. Thus, the precision of the frame assembly can be maintained at a high level by reducing the thickness of the frame assembly. The cover member is a simple cover for covering the frame assembly, and as such does not require particularly high precision. Thus, the mounting leg member can be made thick in order to maintain high strength on the part of the mounting leg member. Since the mounting leg member is integrated with the cover, a structure that is more simple than that entailing separate members can be adopted while still maintaining strength.

According to a preferred embodiment, the cover is fabricated from titanium. The use of titanium, which offers light weight and high strength, allows the mounting leg member to be made thinner, and the cover member to be made lighter while still maintaining strength.

According to another preferred embodiment, the cover member has a smooth surface. Since surface irregularities are minimized, variations in wall thickness are reduced, thereby allowing a lightweight metal cover to be manufactured easily by the lost wax or other high-precision manufacturing process.

According to a further preferred embodiment, the frame assembly further includes a handle support member which is adapted to rotatably support a handle shaft (to which a master gear for rotating the rotor is attached). In a more particular embodiment, the handle support member projects outward from the frame assembly in a direction perpendicular to the frame assembly and includes a support sleeve and at least one bearing disposed within the support sleeve.

More particularly, the handle shaft is supported by the frame assembly alone. Since the cover member performs a covering function exclusively in this embodiment, the need to provide the cover member with a protrusion to support the shaft is obviated. This reduces variations in wall thickness in the cover member, thereby allowing a lightweight metal cover to be manufactured easily by the lost wax or other high-precision manufacturing process.

In another preferred embodiment, a handle support member is provided at two locations disposed within the support sleeve at intervals in the handle axial direction on the frame assembly (i.e., in a direction perpendicular to the frame assembly). Since a shaft support member is provided at two locations, the handle shaft can be supported in a reliable manner by the frame assembly alone.

A plurality of bearings can also provided at a plurality of locations within the support sleeve, and can be disposed at intervals in the direction perpendicular to the frame assembly.

In yet another preferred embodiment, the cover includes a handle support member which is adapted to rotatably support a handle shaft. More particularly, the aforementioned handle shaft is supported by the cover exclusively. In this embodiment, the mounting leg member and one of the shaft supports, components of which high strength is required, are integrated, allowing the rest of the frame assembly to be made lighter and thinner, affording higher precision.

In an additional preferred embodiment, the frame assembly and cover each have a handle support member which are adapted to jointly rotatably support a handle shaft. In this embodiment, the mounting leg member and one of the handle shaft shaft supports, components of which high strength is required, are integrated, allowing the rest of the frame assembly to be made lighter and thinner, affording higher precision.

According to still another preferred embodiment, the cover is fabricated from a metal and the frame assembly is fabricated from a synthetic resin. In this embodiment, since a relatively high-strength metal material is used for the cover, the need to increase the thickness of the mounting leg member and cover member is obviated, preventing the reel from becoming bulky. The frame assembly is fabricated from a relatively lightweight synthetic resin, preventing the reel from becoming overly heavy.

In accordance with another aspect of the present invention, there is provided a cover for a frame assembly as described herein. The cover includes a cover member that is sized to cover an opening in the side of the frame assembly, and a mounting leg member which projects from the cover member. The mounting leg member has a distal end provided with a rod mounting member.

In accordance with yet another aspect of the present invention, there is provided a spinning reel that includes a spinning reel frame assembly and cover as described herein, a rotor rotatably supported on the frame assembly, a spool disposed on the rotor, a rotor drive mechanism, and a handle coupled to the rotor drive mechanism.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the drawings, identical elements are labeled alike throughout.

DETAILED DESCRIPTION OF THE PREFERRED EMBODIMENTS

Figure 1:
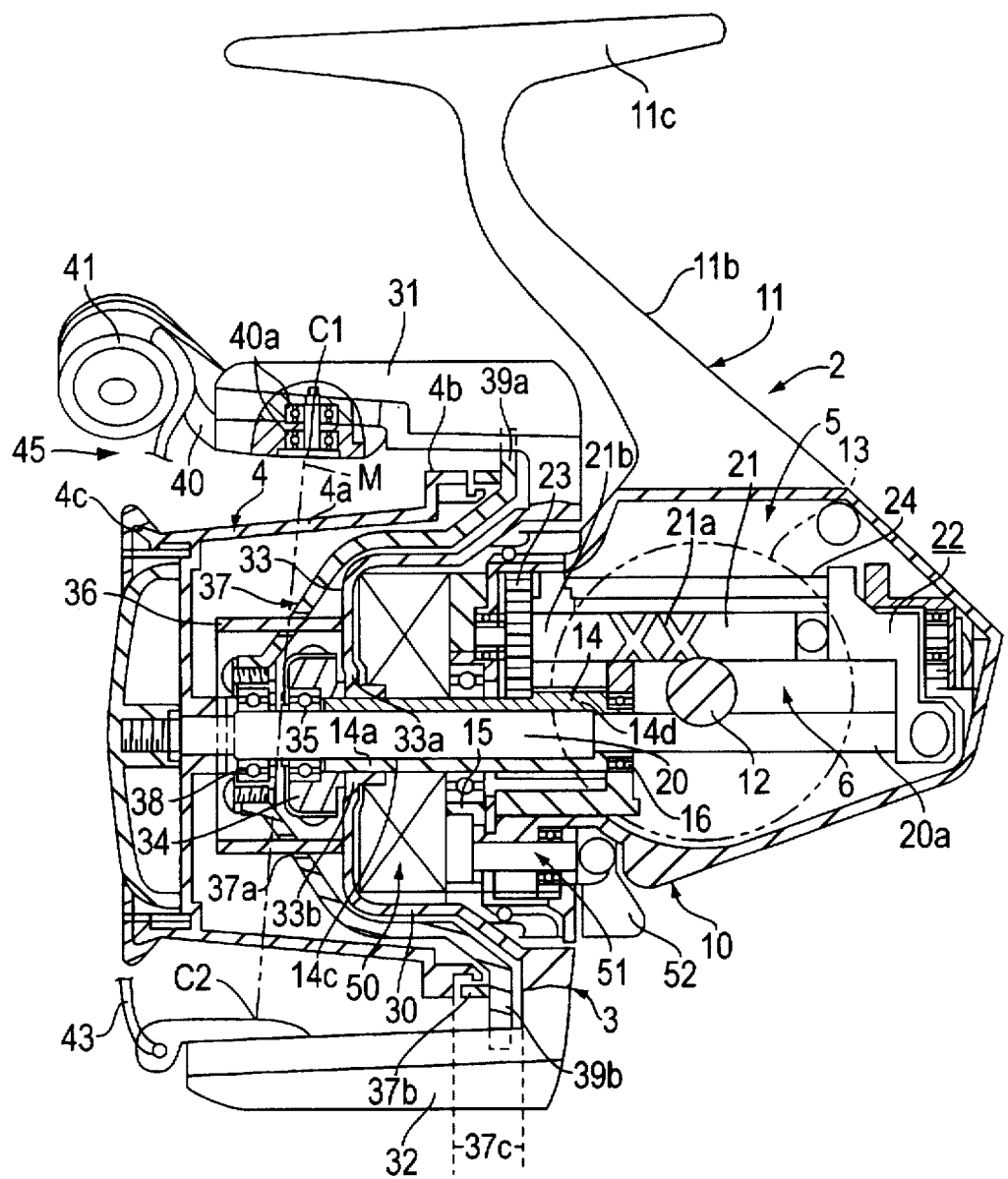
FIG. 1 is a sectional side elevation of a first preferred embodiment of a spinning reel according to the present invention.
Figure 2:
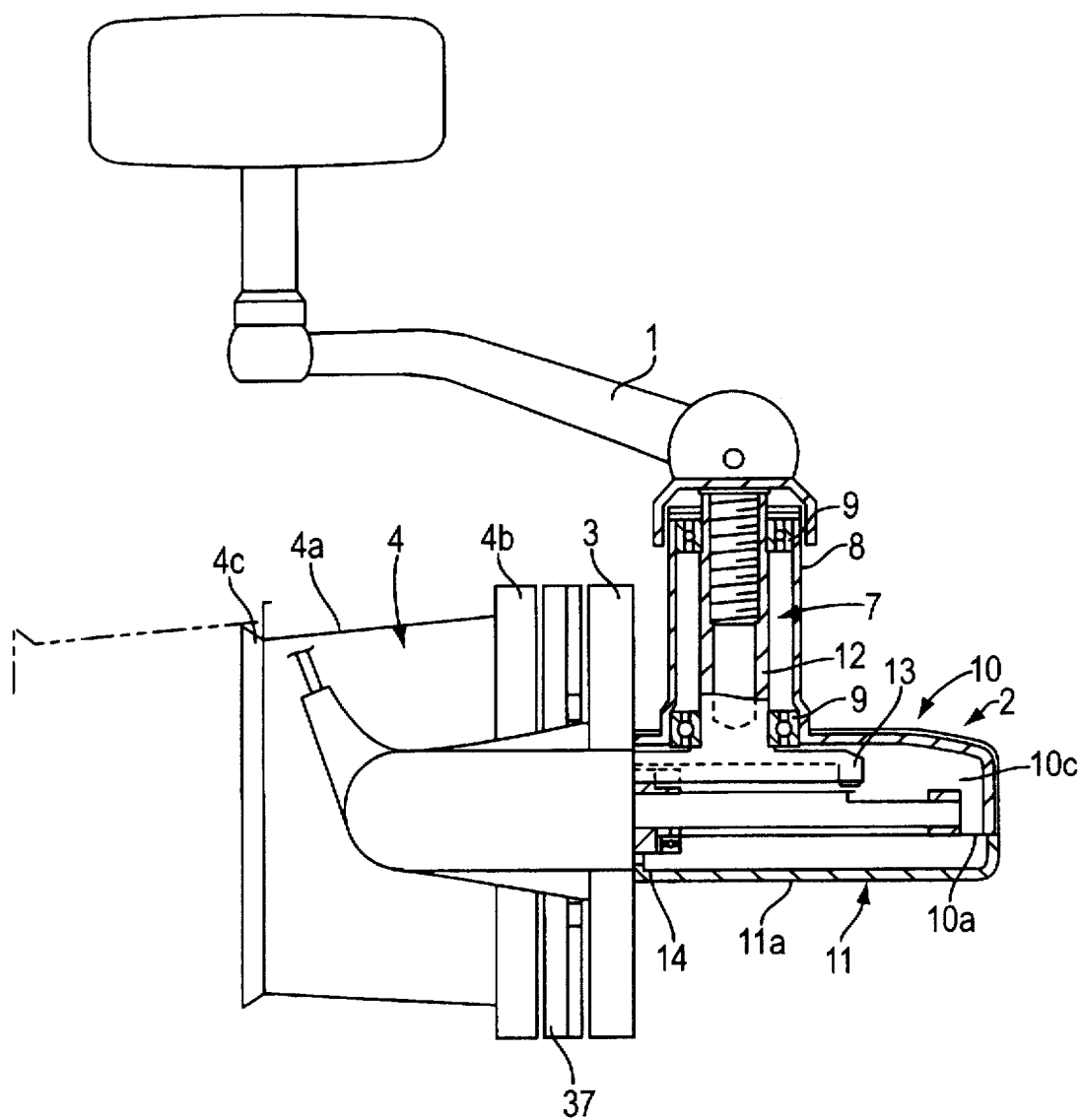
FIG. 2 is a bottom view thereof.
Figure 3:
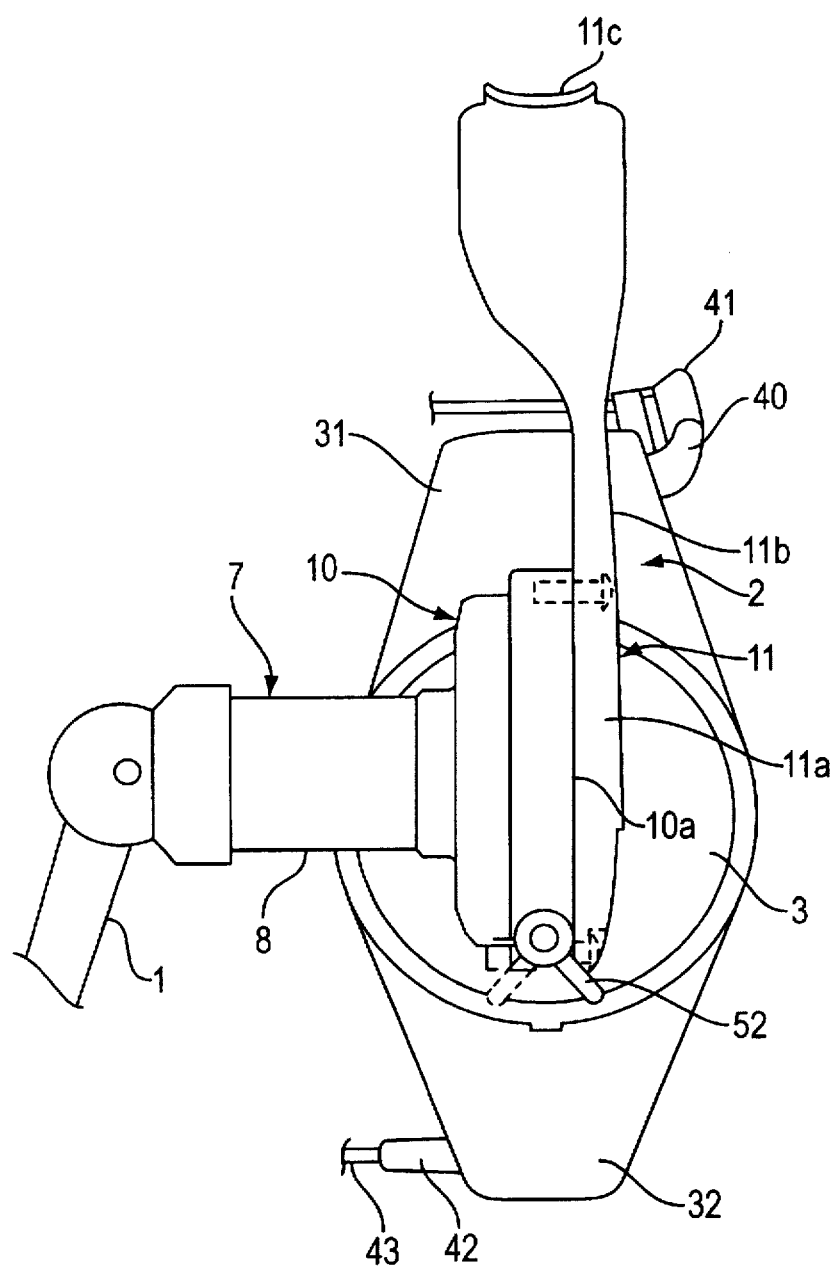
FIG. 3 is a rear elevation thereof.

FIGS. 1 to 3 depict a first preferred embodiment of the present invention in which a spinning reel comprises a reel body 2 on which a handle 1 is rotatably supported, a rotor 3, and a spool 4. The rotor 3 is rotatably supported at the front of the reel body 2. The spool is used for winding a fishing line around its peripheral surface, and is disposed at the front of the rotor 3 in such a manner that it can move forward and backward.

The reel body 2 is equipped with a frame assembly 10 which supports the rotor 3 and the spool 4, and with a cover 11 which detachably screws onto the frame assembly 10. The frame assembly 10 comprises, for example, a thin-walled aluminum alloy component. The frame assembly 10 has a side in which an opening 10a is defined. Opening 10a in turn communicates with the interior 10c of the frame assembly 10. The interior 10c of the frame assembly 10 is equipped with a rotor drive mechanism 5 for rotating the rotor 3, a level wind mechanism 6 for winding up the fishing line evenly through forward and backward motion of the spool 4, and a handle support member 7 which rotatably supports the handle 1.

The cover 11 preferably is fabricated of a metal, for example, from titanium, and preferably is manufactured by the lost wax process. Other known manufacturing processes can also be used to manufacture the cover 11. The cover 11 comprises a thin-walled cover member 11a that covers the opening 10a of the frame assembly 10, and a mounting leg member 11b that projects upward from the cover member 11a. Preferably, the front and back surfaces of the cover member 11a are essentially smooth. The mounting leg member 11b is a solid, thick component provided at its distal end with a rod mounting member 11c that projects in both directions longitudinally. Any other known configuration of the rod mounting member 11c can also be used.

The rotor drive mechanism 5 comprises a master gear 13 which is affixed to and rotates in tandem with a handle shaft 12 to which the handle 1 is affixed, and a pinion gear 14 which meshes with the master gear 13. The pinion gear 14 takes the form of a cylinder; its front end 14a passes through the center of the rotor 13 and extends toward the spool 4 side. A thread is formed at its distal end 14b. The central section 14c and basal end section 14d of the pinion gear 14 in the axial direction are rotatably supported on the frame assembly 10 of the reel body 2 by means of bearings 15 and 16.

The level wind mechanism 6 is a mechanism for moving the spool shaft 20, which is affixed to the center of the spool 4, in the longitudinal direction so that the spool 4 moves in the same direction. The level wind mechanism 6 is provided with a threaded shaft 21 disposed above the spool shaft 20, a slider 22 which moves in the longitudinal direction along the threaded shaft 21, and an intermediate gear 23 affixed to the distal end 21b of the threaded shaft 21. The threaded shaft 21 is disposed parallel to the spool shaft 20, and is rotatably supported by the frame assembly 10. Grooves 21a are formed on the outside surface of the threaded shaft 21. The slider 22 is slidably mounted on a guide shaft 24 disposed above the threaded shaft 21 and parallel to the threaded shaft 21. The basal end 20a of the spool shaft 20 is affixed to the slider 22. The intermediate gear 23 meshes with the pinion gear 14.

The handle support member 7 comprises a support sleeve 8 provided to the frame assembly 10, and two bearings 9 which are disposed within the support sleeve 8 at intervals in the handle shaft 12 axial direction, that is, in the direction perpendicular to the frame assembly 10. More than two bearings 9 can be used if desired. The support sleeve 8 projects outward from the frame assembly 10 perpendicular to the spool shaft 20 (and thus the frame assembly 10).

The rotor 3 comprises a cylindrical member 30, and a first rotor arm 31 and second rotor arm 32 which are disposed on opposite sides of the cylindrical member 30. The cylindrical member 30 and the rotor arms 31 and 32 preferably are integrally formed, but can be separately formed and subsequently joined together.

A front wall 33 is formed on the front of the cylindrical member 30, and a boss 33a is formed in the central portion of the front wall 33. The front end 14a of the pinion gear 14 and the spool shaft 20 are passed through a through hole 33b in the boss 33. A nut 34 is disposed on the front side of the front wall 33; this nut screws onto the threaded section at the distal end 14b of the pinion gear 14. A bearing 35 which rotatably supports the spool shaft 20 is disposed on the inside edge of the nut 34.

The front wall 33 of the rotor 3 is provided with a cylindrical first anti-entanglement component 36 in which a pair of slits extending in the axial direction are made. This first anti-entanglement component 36 prevents the fishing line wound around the spool 4 from entering through the gap between the spool 4 and the rotor 3 and becoming entangled by the spool shaft 20.

The gap with the rotor 3 within the spool 4 is provided with a second anti-entanglement component 37 in order to prevent the fishing line wound around the spool 4 from entering the interior through the gap between the spool 4 and the rotor 3. The second anti-entanglement component 37 takes the form of a bowl; a pair of arc-shaped through holes 37a are formed in its front end to allow the first anti-entanglement component 36 to pass through. A bearing 38 which rotatably supports the spool shaft 20 is disposed in the center of the second anti-entanglement component 37. At the peripheral edge of the second anti-entanglement component 37 are located a cylindrical member 37b for blocking the gap 37c between the back end of the spool 4 and the rotor 3, and a pair of rotor engagement members 39a and 39b which project outward from the cylindrical member 37b. The rotor engagement members 39a and 39b are respectively engaged by the pair of rotor arms 30 and 31 provided to the rotor 3, and serve to rotate the second anti-entanglement component 37 in conjunction with the rotor 3.

A first bail supporting member 40 is mounted in swiveling fashion on the inside edge side of the distal end of the first rotor arm 31. The first bail supporting member 40 is rotatably supported on the first rotor arm 31 by two bearings 40a. The distal end 40b of the first bail supporting member 40 is provided with a line roller 41 for guiding the fishing line onto the spool 4. A second bail supporting member 42 is mounted in swiveling fashion on the inside edge side of the distal end of the second rotor arm 32. The second bail supporting member 42 is fabricated, in a preferred embodiment, from a material with a higher specific gravity than that of other components, and can function as a balancer to cancel out the unbalance produced by the first bail supporting member 40 and the line roller 41 during rotation. The bail 43 is disposed between the line roller 41 at the distal end of the first bail supporting member 40 and the second bail supporting member 42. The bail supporting members 40 and 42, the line roller 41, and the bail 43 together constitute the bail assembly 45. Mounting the bail supporting members 40 and 42 on the inside edge sides of the rotor arms 31 and 32 in this way produces a small radius of gyration on the part of the bail assembly 45, reducing the likelihood of it hitting the rod or the hand. It is therefore possible to shorten the mounting leg member 11b, bringing the spool 4 closer to the rod and reducing the overall size of the spinning reel.

The two bail supporting members 40 and 42 can swivel around a single pivoting axis M. Where center of rotation C1 indicates the point of intersection of the pivoting axis M and the mounting plane of the first bail supporting member 40 of the first rotor arm 31, and center of rotation C2 indicates the point of intersection of the pivoting axis M and the mounting plane of the second bail supporting member 42 of the second rotor arm 32, the center of rotation C2 is located more towards the front than is the center of rotation C1. That is, the pivoting axis M inclines backward compared to the axis which extends perpendicular to the spool shaft 20. The pivoting planes of the bail supporting members 40 and 42 extend perpendicular to the pivoting axis M.

An anti-reverse mechanism 50 is preferably located in the interior of the cylindrical member 30 of the rotor 3. The anti-reverse mechanism 50 preferably is equipped with a roller-type one-way clutch (not shown) and a control mechanism 51 for switching the one-way clutch between enabled and disabled mode. The outer ring of the one-way clutch is affixed to the frame assembly 10 and the inner ring is affixed to the pinion gear 14. The control mechanism 51 has a control lever 52 located at the bottom of the frame assembly 10. Operating the control lever 52 switches the one-way clutch between the two modes so that the rotor 3 is prevented from reversing in the enabled mode and allowed to reverse in the disabled mode.

The spool 4 is disposed between the first rotor arm 31 and the second rotor arm 32 of the rotor 3, and is affixed to the distal end of the spool shaft 20. The spool 4 preferably is provided with a spooling drum 4a, a rear flange 4b formed integrally at the back of the spooling drum 4a, and a front flange 4c affixed to the front of the spooling drum 4a. The spooling drum 4a extends as far as the outside edge of the cylindrical member of the rotor 3, and has a greater drum width than do conventional spinning reels. The height of the two flanges 4b and 4c is lower than that in conventional spinning reels. This reduces resistance when the line is released, and helps to prevent slippage of the line, even when fine line is wound around the spooling drum 4a.

In operation, the bail 43 is moved from the retrieve position to the release line position in order to cast the line. This causes the first and second bail supporting members 40 and 42 to rotate in the same direction with the pivoting axis M as the center. Since the first and second bail supporting members 40 and 42 are disposed on the inside of the first and second rotor arms 31 and 32 and the pivoting axis M is inclined backward with respect to the spool shaft 20, the first bail supporting member 40 and the line roller 41 located at its distal end move closer to the inside than when in the retrieve position. This prevents the fishing line released during casting from becoming entangled by the first bail supporting member 40 and the line roller 41.

When the line is to be retrieved, the bail 43 is moved to the retrieve position. This preferably is accomplished automatically by the action of a cam and spring (not shown) when the handle 1 is rotated in the retrieve direction. When the handle is rotated in the retrieve direction, the rotational force is transmitted to the pinion gear 14 via the handle shaft 12 and the master gear 13. The rotational force that has been transmitted to the pinion gear 14 is in turn transmitted to the rotor 3 via the front end 14a of the pinion gear 14 so that the rotor 3 rotates in the retrieve direction.

At the same time, the threaded shaft 21 is rotated by the intermediate gear 23 which meshes with the pinion gear 14. The slider 22, which engages the spiral groove 21a in the threaded shaft 21, moves in the longitudinal direction guided by the guide shaft 24. This causes the spool shaft 20 and the spool 4 to undergo reciprocating motion in the longitudinal direction so that the fishing line, which has been guided onto the spool 4 by the bail 43 and the line roller 41, is wound around the outside surface of the spooling drum 4a of the spool 4 in a manner which is substantially even in the longitudinal direction.

In a spinning reel with this structure, the thick mounting leg member 11b is integrally formed with the cover member 11a, while the thin-walled frame assembly 10, which houses the various drive components, is fabricated as a separate member from the mounting leg member 11b. This allows the frame assembly 10 to be fabricated with high precision, while at the same time allowing high strength of mounting leg member 11b to be maintained. Since the mounting leg member 11b is integrally formed with the cover member 11a, strength can be maintained in a structure that is simpler than one involving separate members.

In the foregoing preferred embodiment, the handle shaft is supported by the frame assembly exclusively. In another embodiment, the handle shaft is jointly supported by the frame assembly and the cover.

Figure 4:
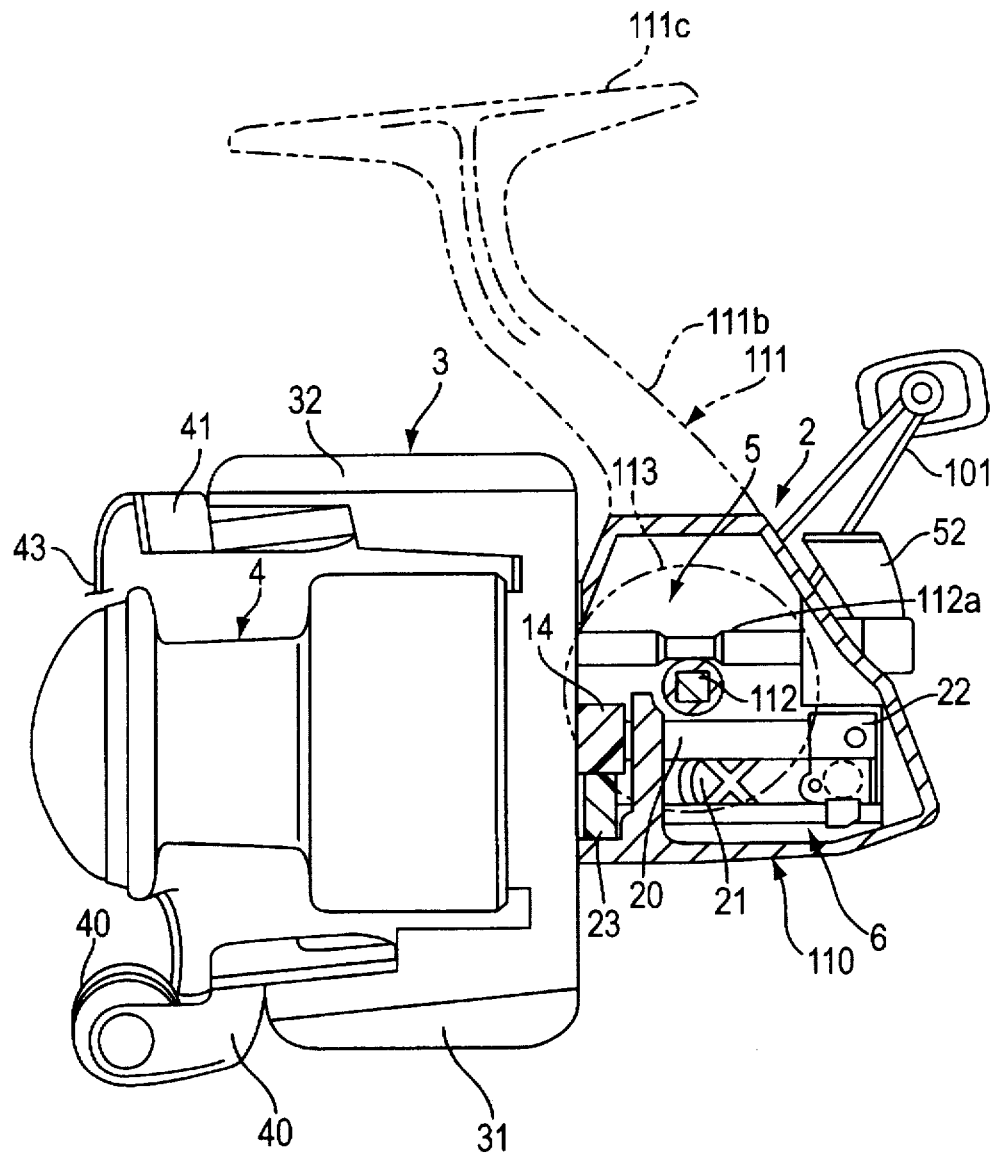
FIG. 4 is a sectional side elevation of a spinning reel pertaining to another embodiment of the present invention.
Figure 5:
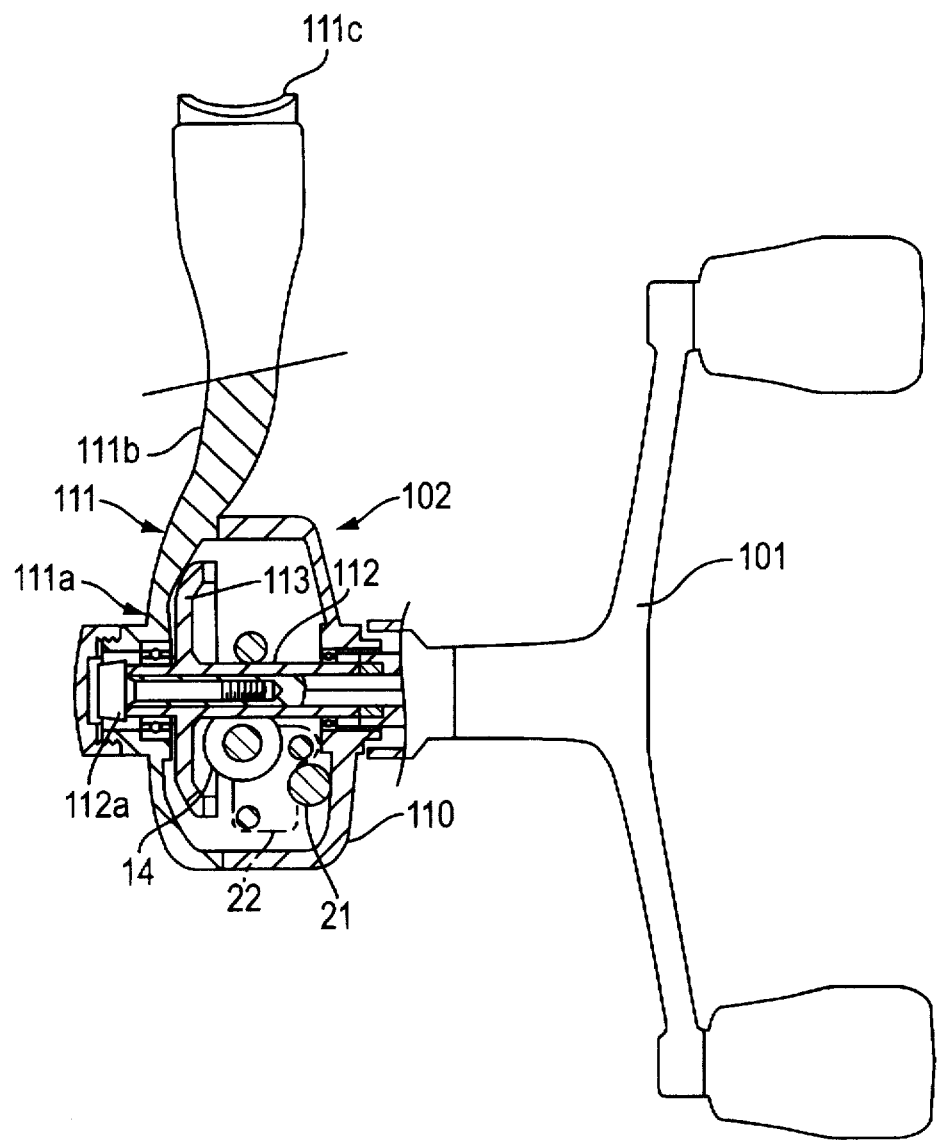
FIG. 5 is a sectional rear elevation thereof.
Figure 6:
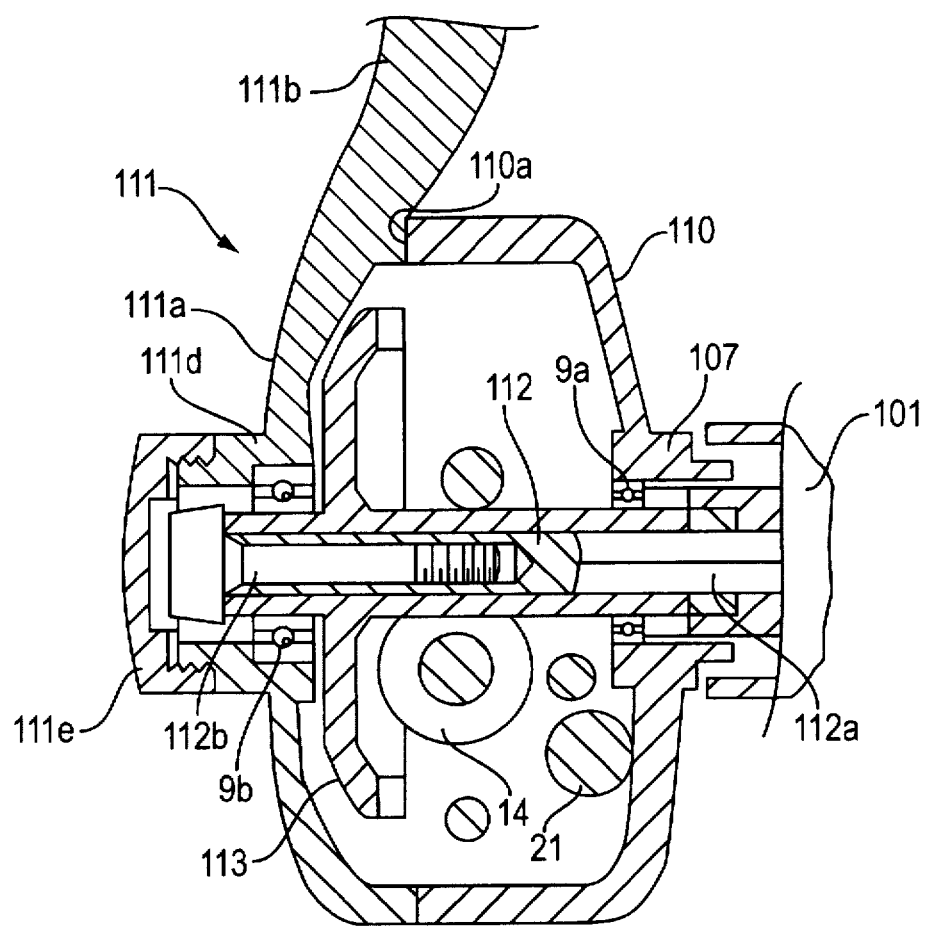
FIG. 6 is an enlarged section thereof.

As shown in FIGS. 4 through 6, the spinning reel comprises a reel body 102 on which a double handle 101a is rotatably supported, a rotor 3, and a spool 4. The rotor 3 is rotatably supported at the front of the reel body 2. The spool 4 is used for winding the fishing line around its peripheral surface, and is disposed at the front of the rotor 3 in such a manner that it can move forward and backward.

The reel body 102 is equipped with a frame assembly 110 which supports the rotor 3 and the spool 4, and with a cover 111 which detachably screws onto the frame assembly 110. The frame assembly 110 comprises, for example, a thin-walled synthetic resin component. As with the preceding embodiment, the interior 110c of the frame assembly 110 is provided with a rotor drive mechanism 5 for rotating the rotor 3 and with a level wind mechanism 6 for winding up the fishing line evenly through forward and backward motion of the spool 4. As shown in FIG. 6, the outside surface of the frame assembly 110 is provided with a handle support member 107 which houses a bearing 9a for rotatably supporting one end of the handle shaft 112.

The cover 111 is fabricated, for example, from an aluminum alloy or another high strength, lightweight metal, and preferably is manufactured by a die casting process. The cover 111 comprises a thin-walled cover member 111a that covers an opening 110a in a side of the frame assembly 110, and a mounting leg member 111b that projects upward from the cover member 111a. The outside surface of the cover member 111a is provided with a handle support member hid which houses a bearing 9b for rotatably supporting the other end of the handle shaft 112. A screw cap 111e detachably screws onto the handle support member 111d. This screw cap 111e prevents water and foreign matter from entering the interior. The mounting leg member 111b preferably i s a thick solid component. A rod mounting member 111c that projects in both directions longitudinally is disposed at its distal end.

The two ends of the handle shaft 112 are rotatably supported by the bearings 9a and 9b, and a master gear 113, preferably an integrally formed master gear, is disposed at the midpoint of the handle shaft 112. A detachable shaft body 112a is mounted in nonrotating fashion on the handle shaft 112, passing through its center. The basal end of the double handle 101 is linked to the shaft body 112a. A fixing bolt 112b screws onto the other end of the shaft body 112a, and the shaft body 112a is secured to the handle shaft 112 by fixing bolt 112b. The head of the fixing bolt 112b is covered by the screw cap 111e.

The construction and operation the foregoing embodiment are in all other respects essentially identical to those of the first preferred embodiment described above, so a repetitive description is not provided here.

In the foregoing embodiment, the mounting leg member 111b and one of the shaft supports 111b, components of which high strength is required, are integrated, thereby allowing the rest of the frame assembly 110 to be made lighter and thinner, affording higher precision. Since a relatively high strength metal material preferably is used for the cover 111, the need to increase the thickness of the mounting leg member 111b and cover member 111a is obviated, preventing the reel from becoming bulky. The frame assembly 110 preferably is fabricated from a relatively lightweight synthetic resin, preventing the reel from becoming overly heavy.

Figure 7:
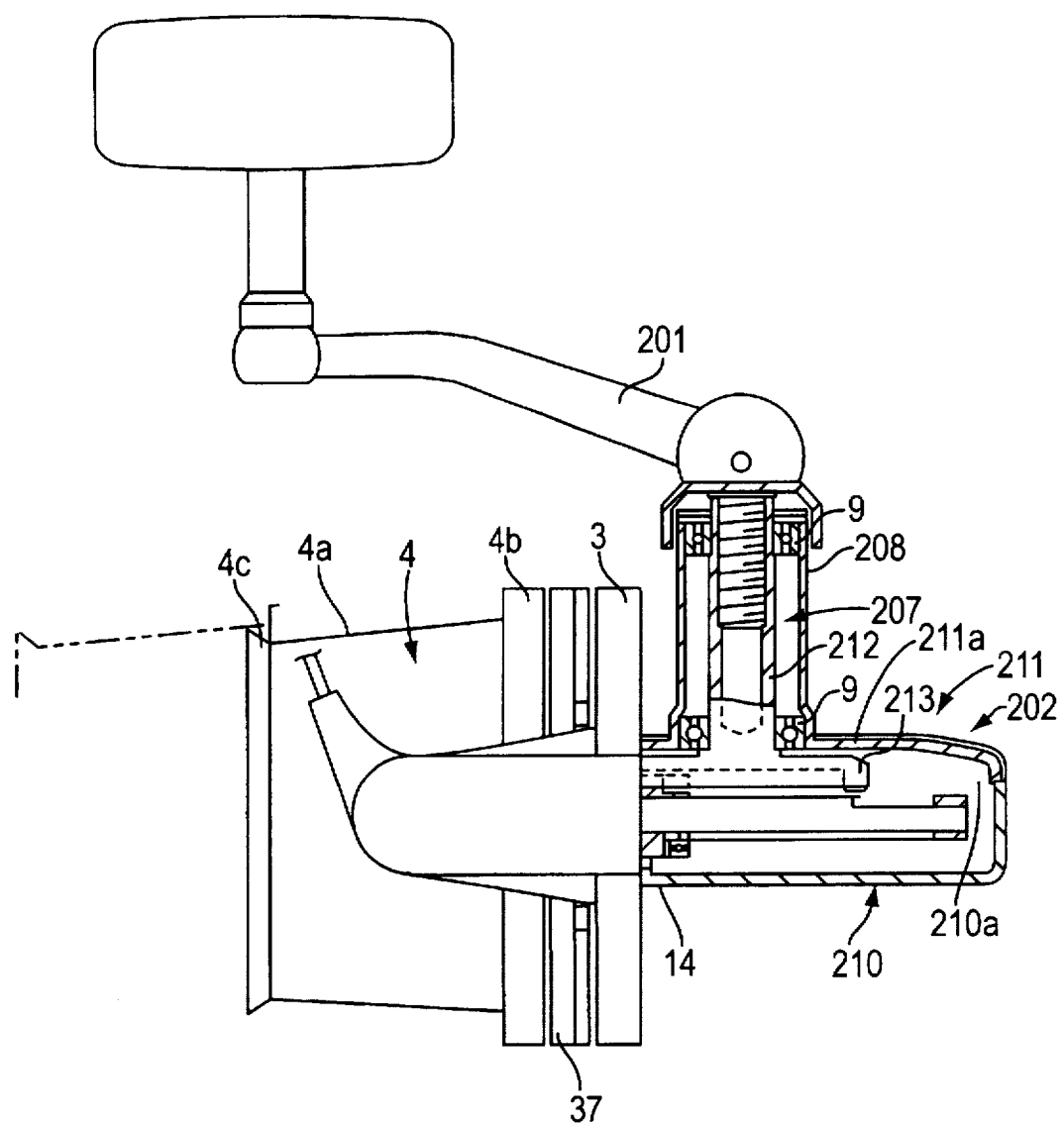
FIG. 7 is an illustration of a spinning reel pertaining to a further preferred embodiment of the present invention, analogous to FIG. 2.
Figure 8:
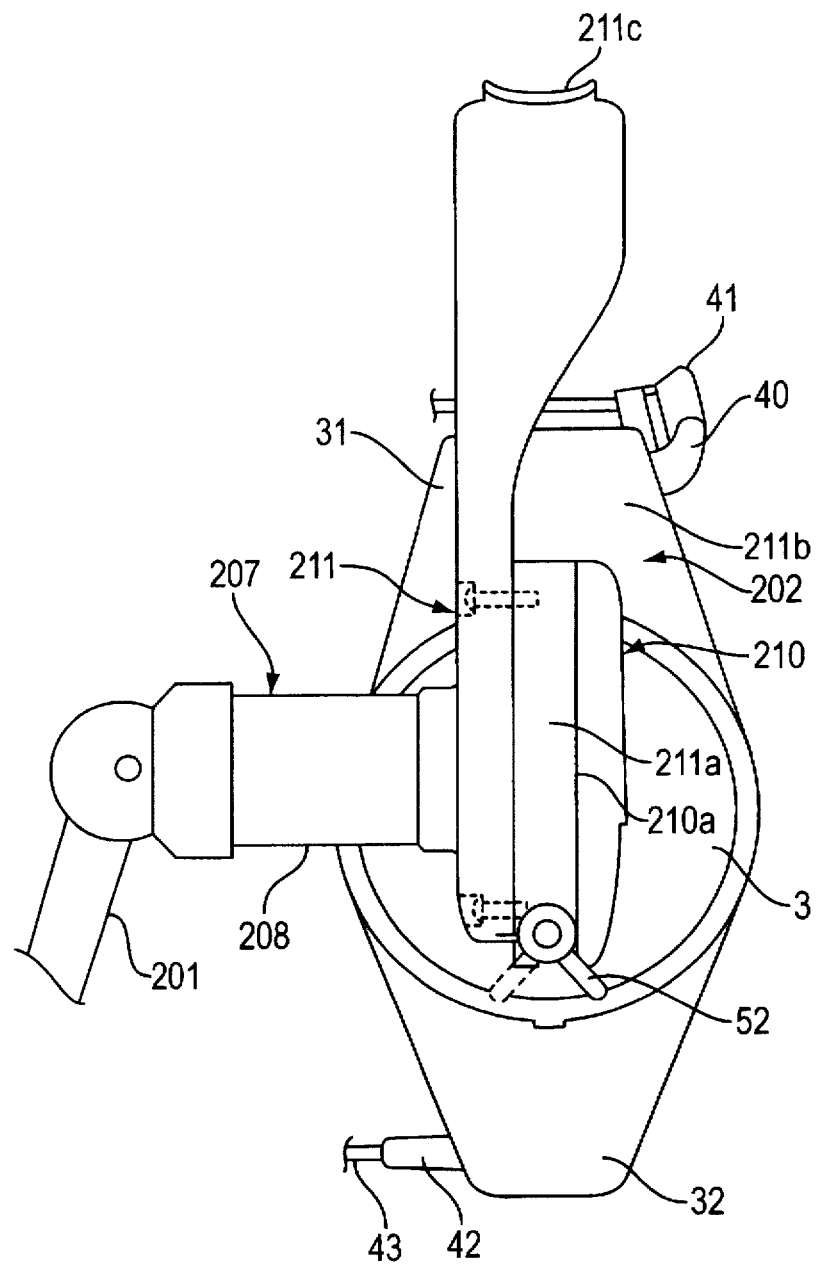
FIG. 8 is an illustration thereof analogous to FIG. 3.

In the foregoing two embodiments, the handle shaft is supported by the frame assembly exclusively, or by the frame assembly and the cover together. As shown in FIGS. 7 and 8, the shaft can also be supported by the cover exclusively.

As shown in FIGS. 7 and 8, the reel body 202 of the spinning reel comprises a frame assembly 210 which supports the rotor 3 and the spool 4, and a cover 211 which detachably screws onto the frame assembly 210. The frame assembly 210 comprises, for example, a thin-walled aluminum alloy component. As with the previous embodiments, the interior 210b of the frame assembly 210 is equipped with a rotor drive mechanism 5 for rotating the rotor 3 and with a level wind mechanism 6 for winding up the fishing line evenly through forward and backward motion of the spool 4.

The cover 211 is fabricated, for example, from titanium, and preferably is manufactured by a lost wax process. The cover 211 comprises a thin-walled cover member 211a that covers the opening 210a of the frame assembly 210, and a mounting leg member 211b that projects upward from the cove r member 211a.

The cover member 211a is i provided with a handle support 207 which rotatably supports the handle 201. The mounting leg member 211b preferably is a thick solid component. A rod mounting member 211c that projects in both directions longitudinally is disposed at its distal end.

The rotor drive mechanism 5 comprises a handle shaft 212 to which the handle 201 is linked, an integrally formed master gear 213 which is located at the distal end of the handle shaft 212, and a pinion gear 14 which meshes with the master gear 213. The handle shaft 212 is rotatably supported by the handle support 207.

The handle support 207 comprises a support sleeve 208 provided to the cover member 211a, and two bearings 9, disposed within the support sleeve 208 at intervals in the axial direction of the handle shaft 212, for rotatably supporting the handle shaft 212. The support sleeve 208 extends outward from the cover member 211a in a direction perpendicular to the spool shaft 20.

The construction and operation of the foregoing embodiment are in all other respects essentially identical to those of the two embodiments described earlier, so a repetitive description is not provided here.

In this embodiment, the mounting leg member 211b and the handle support 207, components of which high strength is required, preferably are integrated, thereby allowing the rest of the frame assembly 210 to be made lighter and thinner, affording higher precision. Since a relatively high strength metal material is preferably used for the cover 211, the need to increase the thickness of the mounting leg member 211b and cover member 211a is obviated, preventing the reel from becoming bulky.

The form of the inventive spinning reel is not limited to the foregoing embodiments, and the present invention has potential application in designs equipped with a drag mechanism, or those equipped with a braking mechanism which incorporates a brake lever, rather than an anti-reverse mechanism.

The form of the mounting leg, cover member, and other components is not limited to those described in the context of the foregoing embodiment.

In the spinning reel frame structure according to the present invention, the frame assembly and the mounting leg member are constituted as separate members. Since the presence of both thin areas and thick areas in a single component is eliminated, the thick areas remain unaffected during molding, even when the wall thickness of the frame assembly is reduced. Thus, the precision of the frame assembly can be maintained at a high level by reducing the thickness of the frame assembly. The cover member is a simple cover for covering the frame assembly, and as such does not require particularly high precision. Thus, the mounting leg member can be made thick in order to maintain high strength on the part of the mounting leg member. Since the mounting leg member is integrated with the cover, a structure that is simpler than that entailing separate members can be adopted while still maintaining strength.

what is claimed is:

1. A spinning reel frame structure for a spinning reel including a spool, a rotor and a handle coupled to said rotor for rotating said rotor, said spinning reel frame structure being mountable on a fishing rod, said spinning reel frame structure comprising:
    (a) a frame assembly that rotatably supports said handle and rotor, and that supports said spool, said frame assembly having a side in which an opening is defined; and
    (b) a cover comprising
        (i) a cover member that is detachably affixed to said frame assembly and that covers said opening in said frame assembly, and
        (ii) a mounting leg member which projects from said cover member, said mounting leg member having a distal end provided with a rod mounting member.

2. A spinning reel frame structure as defined in claim 1, wherein said cover is fabricated from titanium.

3. A spinning reel frame structure as defined in claim 1, wherein said cover member has a smooth surface.

4. A spinning reel frame structure as defined in claim 1, wherein said frame assembly further comprises a handle support member.

5. A spinning reel frame structure as defined in claim 4, wherein said handle support member projects outward from said frame assembly in a direction perpendicular to said frame assembly and comprises a support sleeve and at least one bearing disposed within said support sleeve.

6. A spinning reel frame structure as defined in claim 5 which comprises a plurality of bearings, wherein said plurality of bearings are provided at a plurality of locations disposed within said support sleeve at intervals in the direction perpendicular to said frame assembly.

7. A spinning reel frame structure as defined in claim 5, wherein said frame assembly and said cover each comprise a handle support member, said handle support members jointly rotatably supporting a handle shaft on which said handle is mounted.

8. A spinning reel frame structure as defined in claim 1, wherein said cover further comprises a handle support member.

9. A spinning reel frame structure as defined in claim 1, wherein said cover is fabricated from a metal and said frame assembly is fabricated from a synthetic resin.

10. A spinning reel comprising
    (i) a spinning reel frame structure comprising:
        (a) a frame assembly having an interior for receiving a rotor drive mechanism and a side in which an opening in communication with said interior is defined, said frame assembly being free of mounting leg members, and
        (b) a cover comprising
            (1) a cover member that is detachably affixed to said frame assembly and that covers said opening in said frame assembly, and
            (2) a mounting leg member which projects from said cover member, said mounting leg member having a distal end provided with a rod mounting member,
    (ii) a rotor rotatably supported on said frame assembly,
    (iii) a spool supported on said frame assembly,
    (iv) a rotor drive mechanism, and
    (v) a handle coupled to said rotor drive mechanism.

11. A spinning reel as defined in claim 10, wherein said frame assembly further comprises a handle support member projecting outward in a direction perpendicular to said frame assembly.

12. A spinning reel as defined in claim 11, wherein said handle support member comprises a support sleeve within which is disposed at least one bearing.

13. A spinning reel as defined in claim 12 comprising a plurality of bearings disposed within said support sleeve in spaced relationship in a direction perpendicular to said frame assembly.

14. A spinning reel as defined in claim 12, wherein said rotor drive mechanism comprises a handle shaft to which said handle is affixed and a master gear affixed to said handle shaft, and wherein handle shaft extends outward through said handle support member.

15. A spinning reel as defined in claim 11, wherein said frame assembly and said cover each comprise a handle support member and said handle support members jointly rotatably support said handle shaft.

16. A spinning reel as defined in claim 10, wherein said cover further comprises a handle support member.

* * * * *